United States Patent
Abd Elhamid et al.

(10) Patent No.: US 8,323,415 B2
(45) Date of Patent: Dec. 4, 2012

(54) FAST RECYCLING PROCESS FOR RUTHENIUM, GOLD AND TITANIUM COATINGS FROM HYDROPHILIC PEM FUEL CELL BIPOLAR PLATES

(75) Inventors: Mahmoud H. Abd Elhamid, Grosse Pointe Woods, MI (US); Youssef M. Mikhail, Sterling Heights, MI (US); Richard H. Blunk, Macomb Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1891 days.

(21) Appl. No.: 11/463,614

(22) Filed: Aug. 10, 2006

(65) Prior Publication Data

US 2008/0038625 A1    Feb. 14, 2008

(51) Int. Cl.
  *C23G 1/02*    (2006.01)
(52) U.S. Cl. ............. 134/3; 134/2; 134/10; 134/41
(58) Field of Classification Search .......... 134/2, 3, 134/41, 42
  See application file for complete search history.

(56) References Cited

U.S. PATENT DOCUMENTS

| | | | |
|---|---|---|---|
| 3,236,596 A * | 2/1966 | Kappey et al. | 423/83 |
| 3,562,013 A | 2/1971 | Mickelson et al. | |
| 3,706,600 A | 12/1972 | Pumphrey et al. | |
| 3,761,312 A | 9/1973 | Entwisle et al. | |
| 4,132,569 A * | 1/1979 | DePablo et al. | 134/3 |
| 5,133,843 A * | 7/1992 | Eisman | 205/559 |
| 5,141,563 A | 8/1992 | Colon et al. | |
| 2001/0021470 A1 * | 9/2001 | May et al. | 429/44 |
| 2003/0178112 A1 * | 9/2003 | Takahashi et al. | 148/669 |

FOREIGN PATENT DOCUMENTS

| | | |
|---|---|---|
| GB | EP0052986 A1 * | 2/1982 |
| JP | 2001-230730 | 8/2001 |
| JP | 2002-212650 | 7/2002 |

* cited by examiner

*Primary Examiner* — Michael Kornakov
*Assistant Examiner* — Ryan Coleman
(74) *Attorney, Agent, or Firm* — John A. Miller; Miller IP Group, PLC

(57) ABSTRACT

A method for recovering ruthenium oxide or gold and titanium or titanium oxide from a bipolar plate at the end of the life of a fuel cell stack so as to use these materials in other fuel cell stacks thereafter. The bipolar plate is immersed in a solution including a suitable acid that dissolves the titanium or titanium oxide. The ruthenium oxide or gold will be released from the plate and will float on the solution from which it can be removed. The solution is then heated to evaporate the acid solution leaving a powder of the titanium oxide. The stainless steel of the bipolar plate is thus cleaned of the titanium or titanium oxide, and can be reused.

20 Claims, 2 Drawing Sheets

FAST RECYCLING PROCESS FOR RUTHENIUM, GOLD AND TITANIUM COATINGS FROM HYDROPHILIC PEM FUEL CELL BIPOLAR PLATES

BACKGROUND OF THE INVENTION

1. Field of the Invention

This invention relates generally to a process for recovering ruthenium oxide or gold and titanium or titanium oxide coatings from the bipolar plates of a fuel cell stack and, more particularly, to a method for recycling ruthenium oxide or gold and titanium or titanium oxide coatings from the bipolar plates of a fuel cell stack that includes soaking the plate in an acid solution that dissolves the titanium, where the titanium and the gold or ruthenium oxide are recovered from the solution.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The bipolar plates are typically made of a conductive material, such as stainless steel, titanium, aluminum, polymeric carbon composites, etc., so that they conduct the electricity generated by the fuel cells from one cell to the next cell and out of the stack. Metal bipolar plates typically produce a natural oxide on their outer surface that makes them resistant to corrosion. However, the oxide layer is not conductive, and thus increases the internal resistance of the fuel cell, reducing its electrical performance. Also, the oxide layer makes the plate more hydrophobic. It is known in the art to deposit a thin layer of a conductive material, such as gold, on the bipolar plates to reduce the contact resistance between the plate and diffusion media in the fuel cells.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below $0.2\ A/cm^2$, the water may accumulate within the flow channels because the flow rate of the reactant gas is too low to force the water out of the channels. As the water accumulates, it forms droplets that continue to expand because of the relatively hydrophobic nature of the plate material. The droplets form in the flow channels substantially perpendicular to the flow of the reactant gas. As the size of the droplets increases, the flow channel is closed off, and the reactant gas is diverted to other flow channels because the channels are in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

It is usually possible to purge the accumulated water in the flow channels by periodically forcing the reactant gas through the flow channels at a higher flow rate. However, on the cathode side, this increases the parasitic power applied to the air compressor, thereby reducing overall system efficiency. Moreover, there are many reasons not to use the hydrogen fuel as a purge gas, including reduced economy, reduced system efficiency and increased system complexity for treating elevated concentrations of hydrogen in the exhaust gas stream.

Reducing accumulated water in the channels can also be accomplished by reducing inlet humidification. However, it is desirable to provide some relative humidity in the anode and cathode reactant gases so that the membrane in the fuel cells remains hydrated. A dry inlet gas has a drying effect on the membrane that could increase the cell's ionic resistance, and limit the membrane's long-term durability.

It has been proposed in the art to make bipolar plates for a fuel cell hydrophilic to improve channel water transport. A hydrophilic plate causes water in the channels to form a thin film that has less of a tendency to alter the flow distribution along the array of channels connected to the common inlet and outlet headers. If the plate material is sufficiently wettable, water transport through the diffusion media will contact the channel walls and then, by capillary force, be transported into the bottom corners of the channel along its length. The physical requirements to support spontaneous wetting in the corners of a flow channel are described by the Concus-Finn condition, $\beta+\alpha/2<90°$, where $\beta$ is the static contact angle and $\alpha$ is the channel corner angle. For a rectangular channel $\alpha/2=45°$, which dictates that spontaneous wetting will occur when the static contact angle is less than 45°. For the roughly rectangular channels used in current fuel cell stack designs with composite bipolar plates, this sets an approximate upper limit on the contact angle needed to realize the beneficial effects of hydrophilic plate surfaces on channel water transport and low load stability.

It has been proposed to deposit a titanium or titanium oxide coating on the surface of a stainless steel bipolar plate, cover the titanium or titanium oxide coating with a ruthenium chloride solution, and heat the bipolar plate to form a dimensionally stable ruthenium oxide/titanium oxide coating on the surface of the plate. The titanium oxide provides the hydrophilicity and the ruthenium oxide provides a low contact resistant so the bipolar plate is electrically conductive, hydrophilic, corrosion resistant and stable in a fuel cell environment. See for example, U.S. patent application Ser. No. 11/450,793 filed Jun. 9, 2006, titled Method for Making a Hydrophilic Corrosion Resistant Coating on Low Grade Stainless Steel/Alloys for Bipolar Plates, assigned to the Assignee of this application and herein incorporated by reference.

It has also been proposed in the art to deposit titanium oxide on a stainless steel bipolar plate to increase the hydrophilicity of the plate, and then sputter gold on the titanium oxide coating to decrease the contact resistance of the plate for the same reasons.

Because the various coatings that make the plates hydrophilic and electrically conductive are generally valuable materials having high cost in the market place, their use is limited by their availability and recyclability. Therefore, it would be desirable to recover the gold, ruthenium oxide and/or titanium from the bipolar plates at the end of their life.

SUMMARY OF THE INVENTION

In accordance with the teachings of the present invention, a method is disclosed for recovering ruthenium oxide or gold and titanium from a bipolar plate at the end of the life of a fuel cell stack so as to use these materials in other fuel cell stacks thereafter. In one fuel cell design, a titanium or titanium oxide layer is deposited on a stainless steel bipolar plate to make the plate more hydrophilic, and gold or ruthenium oxide is deposited on the titanium or titanium oxide layer to decrease the contact resistance of the plate and make it more electrically conductive. The bipolar plate is immersed in a solution including a suitable acid, such as a solution of 25% $HNO_3$ and 2% HF or a solution of 1M $H_2SO_4$ and 0.1M HF, that dissolves the titanium or titanium oxide. The ruthenium oxide or gold will be released from the plate and will float on the solution from which it can be removed. The solution is then heated to evaporate the acid solution leaving a powder of the titanium oxide. The stainless steel substrate of the bipolar plate is thus cleaned of the titanium, and can be reused.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a process for removing ruthenium, gold and/or titanium from a bipolar plate is merely exemplary in nature, and is in no way intended to limit the invention or its applications or uses.

Figure 1:
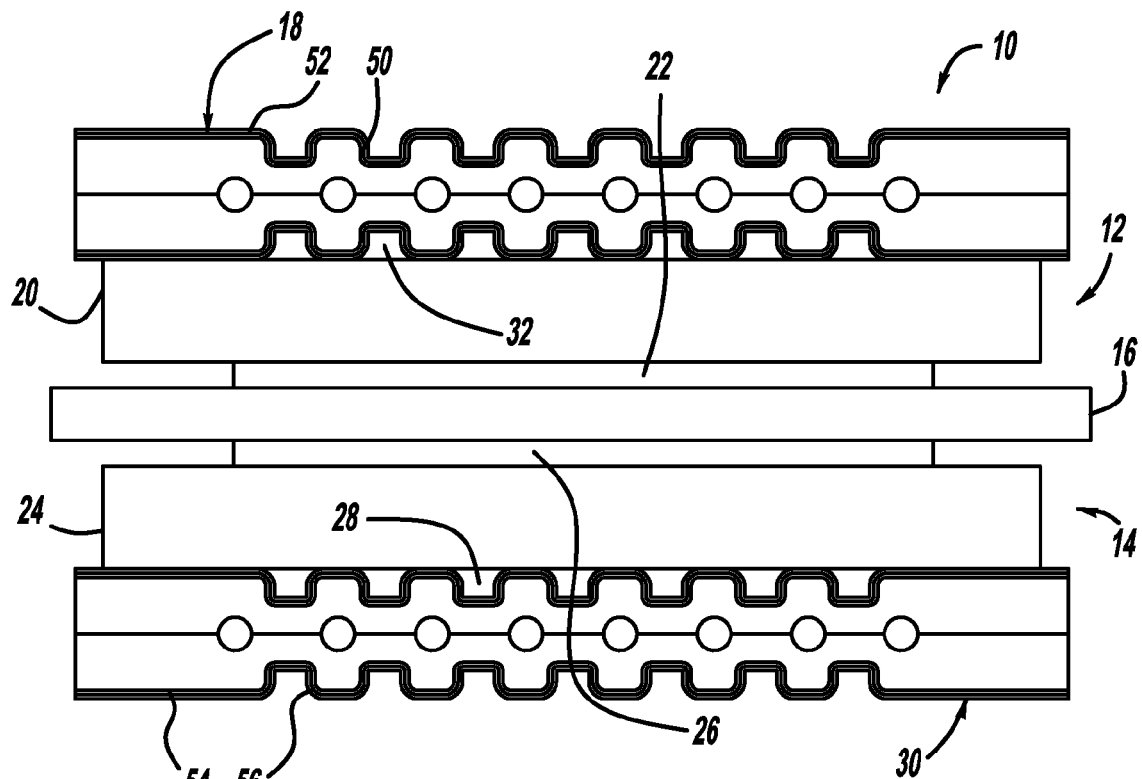
FIG. 1 is a cross-sectional view of a fuel cell for a fuel cell stack that includes bipolar plates having a titanium oxide layer that makes the bipolar plate hydrophilic and an electrically conductive layer that reduces the contact resistance of the bipolar plate.

FIG. 1 is a cross-sectional view of a fuel cell 10 that is part of a fuel cell stack of the type discussed above. The fuel cell 10 includes a cathode side 12 and an anode side 14 separated by a perfluorosulfonic acid membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 18 is provided on the cathode side 12 and an anode side flow field plate or bipolar plate 30 is provided on the anode side 14. The bipolar plates 18 and 30 are provided between the fuel cells in the fuel cell stack. A hydrogen reactant gas flow from flow channels 28 in the bipolar plate 30 reacts with the catalyst layer 26 to dissociate the hydrogen ions and the electrons. Airflow from flow channels 32 in the bipolar plate 18 reacts with the catalyst layer 22. The hydrogen ions are able to propagate through the membrane 16 where they carry the ionic current through the membrane. The by-product of this electrochemical reaction is water.

The bipolar plate 18 includes a titanium or titanium oxide layer 50 that makes the plate 18 hydrophilic and an electrically conductive layer 52 that decreases the contact resistance of the bipolar plate 18. Likewise, the bipolar plate 30 includes a titanium or titanium oxide layer 54 that makes the plate 30 hydrophilic and an electrically conductive layer 56 that decreases the contact resistance of the plate 30. In one embodiment, the layers 52 and 56 are gold or titanium oxide/ruthenium oxide. Various other conductive materials are known in the art for the layers 52 and 56, such as iridium, platinum and other noble metals.

According to the invention, a method for recycling the bipolar plates 18 and 20 is provided that recovers the titanium oxide from the titanium or titanium oxide layers 50 and 54, and the conductive material from the conductive layers 52 and 56. If the conductive material is gold it can be melted and sputtered onto a titanium or titanium oxide layer for another bipolar plate. If the conductive material is ruthenium oxide it can be converted to ruthenium chloride by known processes and then dissolved in an ethanol solution to be reused. Further, the cleaned stainless steel bipolar plate structure can be reused in future bipolar plates in other fuel cell stacks. If the stainless steel has suffered significant corrosion, then the stainless steel can be re-milled to make other bipolar plates.

Figure 2:
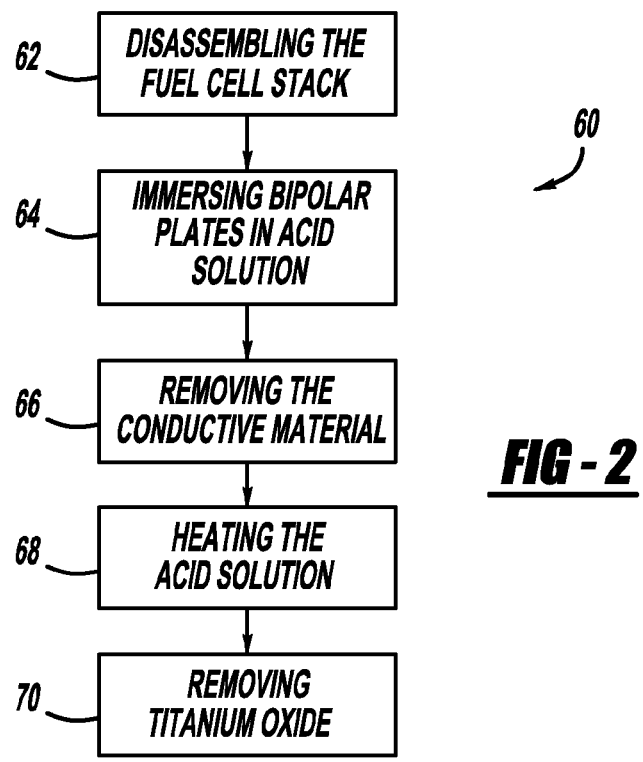
FIG. 2 is a flow chart diagram showing a method for recycling a bipolar plate, according to an embodiment of the present invention.

FIG. 2 is a flow chart diagram 60 showing a method for recycling titanium or titanium oxide, ruthenium oxide and/or gold and the stainless steel bipolar plate from a fuel cell stack, according to an embodiment of the present invention. The method includes disassembling the fuel cell stack at box 62. The method then includes immersing the bipolar plates in a container including an acid solution that passivates the stainless steel to remove free iron and passivates the surface to make it more corrosion resistant at box 64. In one non-limiting embodiment, the solution includes water, 25% $HNO_3$ and 2% HF or water, 1M $H_2SO_4$ and 0.1M HF. The titanium or titanium oxide layer dissolves in the solution, which causes the conductive layer to also be released into the solution. If the conductive material is gold or ruthenium oxide, it will float on the solution. Once the complete titanium or titanium oxide layer has been removed from the bipolar plate, the gold or ruthenium oxide can be skimmed off of the solution at box 66. The solution is then heated at box 68 to evaporate the solution. The titanium oxide will remain as a powder in the container where it can be removed at box 68. In one embodiment, the entire process of dissolving the titanium or titanium oxide layer and evaporating the acid solution is in the range of 1-5 minutes. Depending on whether the stainless steel of the bipolar plate has corroded and is still a viable design, it may be able to be reused in another fuel cell stack.

Figure 3:
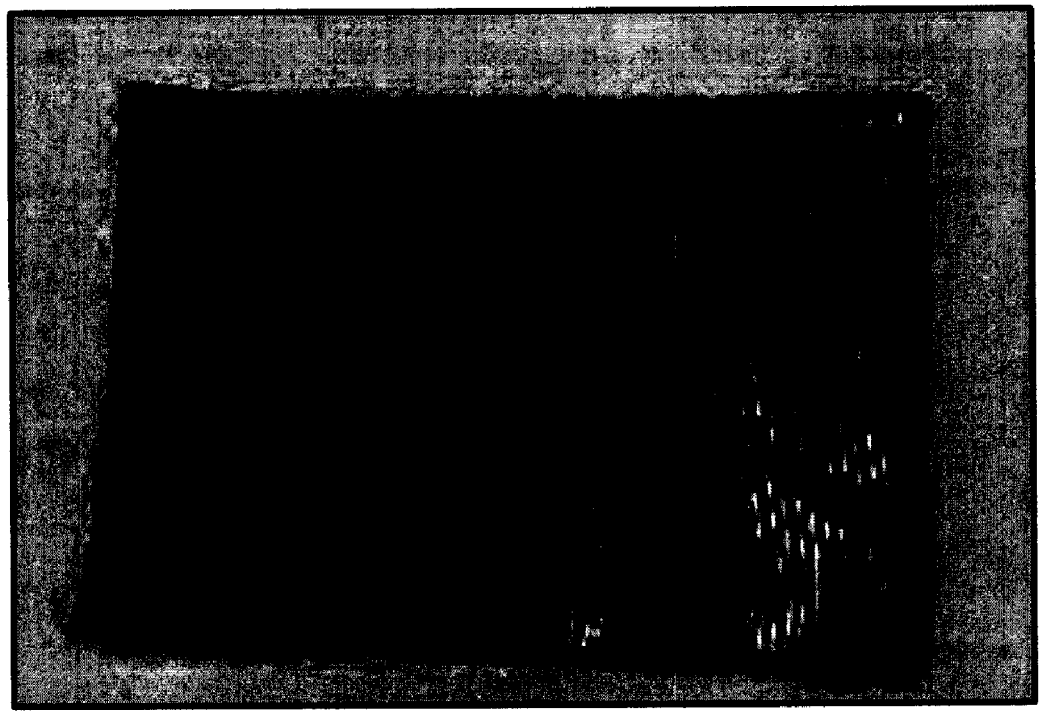
FIG. 3 is a photograph of a bipolar plate including a ruthenium oxide and titanium oxide coating.
Figure 4:
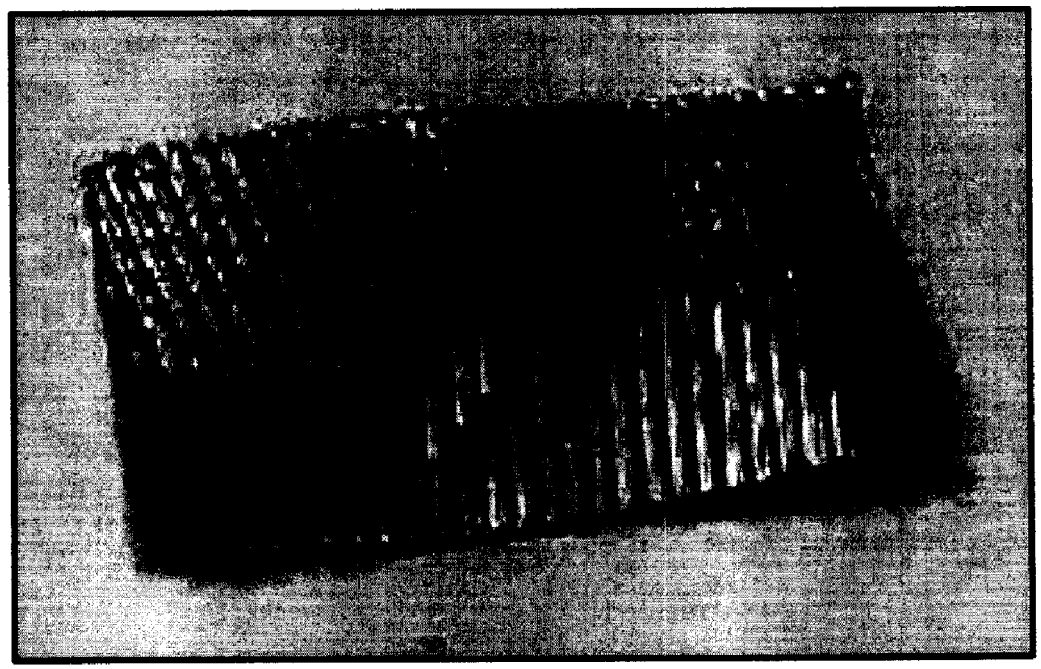
FIG. 4 is a photograph of the bipolar plate after the ruthenium oxide and titanium oxide coating has been removed to expose the stainless steel of the plate below, according to the recycling process of the present invention.

FIG. 3 is a photograph of a bipolar plate including a ruthenium oxide/titanium oxide coating. FIG. 4 is a photograph of the bipolar plate after the ruthenium oxide/titanium oxide coating has been removed to expose the stainless steel of the plate below, according to the recycling process of the present invention.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for recycling a bipolar plate including a titanium or titanium oxide layer and a conductive layer deposited on the titanium or titanium oxide layer, said method comprising:
   soaking the bipolar plate in a container including an acid solution that dissolves the titanium or titanium oxide layer;
   skimming conductive material from the conductive layer that is floating on the acid solution to remove it from the container after the titanium or titanium oxide layer has dissolved;
   heating the acid solution to evaporate the acid solution; and
   removing titanium oxide from the container after the acid solution has evaporated.

2. The method according to claim 1 wherein the acid solution is a solution including water, 25% $HNO_3$ and 2% HF.

3. The method according to claim 1 wherein the acid solution is a solution including water, 1M $H_2SO_4$ and 0.1M HF.

4. The method according to claim 1 wherein the conductive material is ruthenium oxide.

5. The method according to claim 1 wherein the conductive material is iridium oxide.

6. The method according to claim 1 wherein the conductive material is gold.

7. The method according to claim 1 wherein the conductive material is platinum.

8. The method according to claim 1 wherein the bipolar plate is a stainless steel bipolar plate.

9. The method according to claim 1 further comprising using the bipolar plate in another fuel cell stack after it has been recycled.

10. The method according to claim 1 wherein removing the titanium oxide from the container includes removing the titanium oxide as a powder from the container.

11. A method for recycling a stainless steel bipolar plate including a titanium oxide/ruthenium oxide layer deposited on a titanium or titanium oxide layer, said method comprising:
    soaking the bipolar plate in a container including an acid solution that dissolves the titanium or titanium oxide in the titanium or titanium oxide layer on which the titanium oxide/ruthenium oxide layer is deposited;
    skimming the ruthenium oxide floating on the acid solution to remove it from the container after the titanium or titanium oxide in the titanium or titanium oxide layer on which the titanium oxide/ruthenium oxide layer is deposited has dissolved;
    heating the acid solution to evaporate the acid solution; and
    removing the titanium oxide from the container after the acid solution has evaporated.

12. The method according to claim 11 further comprising converting the ruthenium oxide to ruthenium chloride to be applied to a titanium or titanium oxide layer of another bipolar plate.

13. The method according to claim 11 wherein the acid solution is a solution including water, 25% $HNO_3$ and 2% HF.

14. The method according to claim 11 wherein the acid solution is a solution including water, 1M $H_2SO_4$ and 0.1M HF.

15. The method according to claim 11 further comprising using the bipolar plate in another fuel cell stack after it has been recycled.

16. The method according to claim 11 wherein removing the titanium oxide from the container includes removing the titanium oxide as a powder from the container.

17. A method for recycling a stainless steel bipolar plate including a titanium or titanium oxide layer and a gold layer deposited on the titanium or titanium oxide layer, said method comprising:
    soaking the bipolar plate in a container including an acid solution that dissolves the titanium or titanium oxide layer;
    skimming the gold floating on the acid solution to remove it from the container after the titanium or titanium oxide layer has dissolved;
    heating the acid solution to evaporate the acid solution; and
    removing the titanium oxide from the container after the acid solution has evaporated.

18. The method according to claim 17 wherein the acid solution is a solution including water, 25% $HNO_3$ and 2% HF.

19. The method according to claim 17 wherein the acid solution is a solution including water, 1M $H_2SO_4$ and 0.1M HF.

20. The method according to claim 17 further comprising using the bipolar plate in another fuel cell stack after it has been recycled.

* * * * *